United States Patent
Saito et al.

(10) Patent No.: US 10,232,881 B2
(45) Date of Patent: Mar. 19, 2019

(54) VEHICLE BODY FRONT STRUCTURE

(71) Applicant: HONDA MOTOR CO., LTD., Minato-ku, Tokyo (JP)

(72) Inventors: Satoshi Saito, Utsunomiya (JP); Akihisa Kudoh, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/577,407

(22) PCT Filed: Jun. 7, 2016

(86) PCT No.: PCT/JP2016/066866
§ 371 (c)(1),
(2) Date: Nov. 28, 2017

(87) PCT Pub. No.: WO2016/208374
PCT Pub. Date: Dec. 29, 2016

(65) Prior Publication Data
US 2018/0170434 A1 Jun. 21, 2018

(30) Foreign Application Priority Data
Jun. 25, 2015 (JP) .................. 2015-127934

(51) Int. Cl.
*B62D 25/08* (2006.01)
*B62D 25/14* (2006.01)
(Continued)

(52) U.S. Cl.
CPC ............ *B62D 21/11* (2013.01); *B62D 21/152* (2013.01); *B62D 25/082* (2013.01);
(Continued)

(58) Field of Classification Search
CPC .... B62D 25/08; B62D 25/081; B62D 25/082; B62D 25/088; B62D 25/14; B62D 21/11; B62D 21/152
(Continued)

(56) References Cited

U.S. PATENT DOCUMENTS 8,240,747 B2 8/2012 Kim
9,126,634 B2 * 9/2015 Sasaki ................. B62D 25/088
(Continued)

FOREIGN PATENT DOCUMENTS

EP 2428432 3/2012
EP 2540597 1/2013
(Continued)

OTHER PUBLICATIONS

International Search Report for International Patent Application No. PCT/JP2016/066866 dated Aug. 30, 2016, 4 pages.
(Continued)

*Primary Examiner* — Gregory A Blankenship
(74) *Attorney, Agent, or Firm* — Amin, Turocy & Watson LLP

(57) ABSTRACT

A vehicle body front structure includes a corner reinforcement member (22) that connects a damper housing reinforcement member (21) and an upper dash panel reinforcement member (15). The corner reinforcement member (22) is a member having a substantially L-shaped step section (22*f*), and has a first portion (22*a*) facing the damper housing reinforcement member (21) in a vehicle body width direction and joined to the damper housing reinforcement member (21), a second portion (22*b*) extending from the first portion (22*a*) toward an inner side of a vehicle body in the vehicle body width direction, a third portion (22*c*) facing the upper dash panel reinforcement member (15) from below and joined to the upper dash panel reinforcement member
(Continued)

(15), and a fourth portion (22d) extending downward from the third portion (22c). The first portion (22a) and the third portion (22c) are formed as a continuous surface. The second portion (22b) and the fourth portion (22d) are formed as a continuous surface. A bottom surface (22fa) of the step section (22f) and the first portion (22a) are formed as a continuous surface.

7 Claims, 10 Drawing Sheets

(51) Int. Cl.
  *B62D 21/11* (2006.01)
  *B62D 21/15* (2006.01)
(52) U.S. Cl.
  CPC ............ *B62D 25/088* (2013.01); *B62D 25/14* (2013.01); *B62D 25/145* (2013.01)
(58) Field of Classification Search
  USPC .......... 296/203.02, 187.09, 192, 193.09, 198
  See application file for complete search history.

(56) References Cited

U.S. PATENT DOCUMENTS

| | | | |
|---|---|---|---|
| 2003/0189358 A1* | 10/2003 | Watanabe | B62D 25/081 296/203.02 |
| 2006/0006699 A1 | 1/2006 | Matsuyama et al. | |
| 2008/0265623 A1* | 10/2008 | Kiyotake | B62D 21/152 296/187.09 |
| 2009/0066116 A1 | 3/2009 | Kuroita et al. | |
| 2012/0187711 A1* | 7/2012 | Yamagishi | B60T 7/06 296/72 |
| 2013/0221705 A1* | 8/2013 | Sugishima | B60R 13/0838 296/192 |
| 2014/0292028 A1* | 10/2014 | Dix | B62D 21/152 296/187.1 |
| 2014/0367994 A1* | 12/2014 | Sasaki | B62D 25/08 296/187.09 |
| 2015/0015030 A1 | 1/2015 | Sasaki et al. | |
| 2015/0175216 A1 | 6/2015 | Hisazumi et al. | |
| 2015/0314810 A1 | 11/2015 | Watanabe et al. | |
| 2016/0288839 A1* | 10/2016 | Fukuoka | B62D 25/088 |
| 2018/0029649 A1* | 2/2018 | Maruyama | B62D 21/02 |
| 2018/0170434 A1* | 6/2018 | Saito | B62D 21/11 |

FOREIGN PATENT DOCUMENTS

| | | |
|---|---|---|
| JP | 2006-021590 | 1/2006 |
| JP | 2009-067147 | 4/2009 |
| JP | 2012-061901 | 3/2012 |
| JP | 2013-010414 | 1/2013 |
| JP | 2013-216139 | 10/2013 |
| JP | 2013-241089 | 12/2013 |
| WO | 2013105322 | 7/2013 |
| WO | 2014119363 | 8/2014 |

OTHER PUBLICATIONS

Written Opinion for International Patent Application No. PCT/JP2016/066866 dated Aug. 30, 2016, 4 pages.

* cited by examiner

VEHICLE BODY FRONT STRUCTURE

TECHNICAL FIELD

The present invention relates to a vehicle body front structure.

Priority is claimed on Japanese Patent Application No. 2015-127934, filed Jun. 25, 2015, the content of which is incorporated herein by reference.

BACKGROUND ART

A vehicle body front structure includes a front side frame extending forward from below a front section of a passenger compartment, a damper housing configured to support a damper of a front suspension, or the like. Here, various reinforcement structures configured to increase the rigidity of the vehicle body front structure are proposed (for example, see Patent Documents 1 and 2).

CITATION LIST

Patent Document

[Patent Document 1]
   Japanese Unexamined Patent Application, First Publication No. 2013-241089
[Patent Document 2]
   U.S. Pat. No. 8,240,747

SUMMARY OF INVENTION

Technical Problem

When a relatively large reinforcement member is installed to increase the rigidity of the vehicle body front structure, a vehicle body weight is increased. In addition, when a relatively large reinforcement member is installed, the reinforcement member may interfere and a portion that cannot be easily joined (welded) may be generated in the vehicle body front structure. For this reason, it is desired to efficiently increase the rigidity of a vehicle body front structure with a relatively small component.

Here, an aspect of the present invention is to provide a vehicle body front structure in which it is possible to efficiently increase the rigidity.

Solution to Problem

A vehicle body front structure according to an aspect of the present invention includes a front side frame (for example, a front side frame (3) in the embodiment) extending in a vehicle body forward/rearward direction; a damper housing (for example, a damper housing (5) of the embodiment) having a wall surface (for example, a wall surface (13) of the embodiment) that is disposed above the front side frame and that is directed toward an engine compartment in a vehicle body width direction; a damper housing reinforcement member (for example, a damper housing reinforcement member (21) of the embodiment) that extends along the wall surface of the damper housing in an upward/downward direction and that has a lower end portion which is joined to the front side frame; an upper dash panel reinforcement member (for example, an upper dash panel reinforcement member (15) of the embodiment) that is installed above the front side frame and that is extending in the vehicle body width direction; and a corner reinforcement member (for example, a corner reinforcement member (22) of the embodiment) that connects an upper end portion of the damper housing reinforcement member and the upper dash panel reinforcement member. The corner reinforcement member is a member that has a substantially L-shaped step section (for example, a step section (22f) of the embodiment), and that has a first portion (for example, a first portion (22a) of the embodiment) facing the damper housing reinforcement member in the vehicle body width direction and joined to the damper housing reinforcement member, a second portion (for example, a second portion (22b) of the embodiment) extending from a rear end portion of the first portion in the vehicle body forward/rearward direction toward an inner side of a vehicle body in the vehicle body width direction, a third portion (for example, a third portion (22c) of the embodiment) facing the upper dash panel reinforcement member from below and joined to the upper dash panel reinforcement member, and a fourth portion (for example, a fourth portion (22d) of the embodiment) extending downward from a rear end portion of the third portion in the vehicle body forward/rearward direction. The first portion and the third portion are formed as a continuous surface. The second portion and the fourth portion are formed as a continuous surface. A bottom surface of the step section and the first portion are formed as a continuous surface.

In this case, instead of a substantially L-shaped step structure that is connected by one surface, a substantially L-shaped step structure that is connected by at least three continuous surfaces (for example, a continuous surface between the first portion and the third portion, a continuous surface between the second portion and the fourth portion, and a continuous surface between the bottom surface of the step section and the first portion) is formed between the damper housing reinforcement member and the upper dash panel reinforcement member which is substantially perpendicular to the damper housing reinforcement member. For this reason, the corner reinforcement member can respond to not only a load of a damper input in the upward/downward direction (a load in one direction) but also a load of a damper input in the vehicle body forward/rearward direction and a load in the vehicle body width direction by distributing the load. For this reason, the rigidity of the vicinity of the damper housing can be increased by the reinforcement member having a relatively light weight. Accordingly, the rigidity of the vehicle body front structure can be efficiently increased.

In this case, further, the lower end portion of the damper housing reinforcement member is joined to the front side frame. For this reason, the rigidity of the vehicle body front structure can be further increased.

The front side frame may have an inner panel (for example, an inner panel (31) of the embodiment) and an outer panel (for example, an outer panel (32) of the embodiment) which is adjacent to the damper housing and which is joined to the inner panel to form a closed cross section together with the inner panel, the outer panel may have an extension portion (for example, an extension portion (34) of the embodiment) extending above a joint portion (for example, a joint portion (35) of the embodiment) between the outer panel and the inner panel, and a lower end portion of the damper housing reinforcement member may be joined to the extension portion of the outer panel together with the damper housing.

Here, when an excessively large load is applied from the damper to the damper housing, the damper housing exhibits a behavior of tilting toward the inner side of the vehicle body (a so-called falling-down behavior).

However, in this case, the damper housing reinforcement member is supported by the extension portion of the outer panel of the front side frame at a position higher than the joint portion that forms the closed cross section of the front side frame (a position closer to the damper base). Accordingly, the rigidity of the damper housing with respect to the falling-down behavior can be increased. In other words, the rigidity of the damper housing with respect to the falling-down behavior can be increased without coupling a reinforcement member such as a gusset of the closed cross section to the front side frame. When the rigidity of the damper housing with respect to the falling-down behavior can be increased, the rigidity required for the corner reinforcement member is decreased, and additional reduction in size and weight of the corner reinforcement member can be achieved. Accordingly, the rigidity of the vehicle body front structure can be more efficiently increased.

In addition, in this case, welding dots (for example, spot welding dots) that join the damper housing to the front side frame can be formed in two upper and lower rows at the joint portion between the outer panel and the inner panel and the extension portion of the outer panel. When the welding dots can be formed in the upper and lower two rows, the rigidity of the damper housing with respect to the falling-down behavior can be further increased.

In addition, in this case, in the two upper and lower rows at the joint portion between the outer panel and the inner panel and the extension portion of the outer panel, the welding dots can be formed in a zigzag manner. When the welding dots can be formed in a zigzag manner, the dots can be densely disposed in comparison with the case in which the welding dots are formed in a row. When the welding dots can be densely disposed, a coupling strength between the damper housing and the front side frame is increased. Accordingly, the rigidity of the damper housing with respect to the falling-down behavior can be further increased.

The damper housing may include a damper base (for example, a damper base (12) of the embodiment) having a substantially rectangular shape when seen in a plan view, the damper base may have a damper attachment section (for example, a damper attachment section (37) of the embodiment) having a substantially triangular shape when seen in a plan view, a rear end portion (for example, a rear end portion (37e) of the embodiment) of the damper attachment section may be joined to the upper dash panel (for example, the upper dash panel (6) of the embodiment), and the damper base may have a ridge portion (for example, a ridge portion (40) of the embodiment), which is extending along at least a portion of a contour of the damper attachment section, formed between a front edge portion of the damper base and the damper attachment section.

In this case, since the rear end portion of the damper attachment section is joined to the upper dash panel, out-of-plane deformation in the region between the rear edge portion of the damper base and the damper attachment section can be suppressed. In addition, as the ridge portion is formed, out-of-plane deformation in the region between the front edge portion of the damper base and the damper attachment section can be suppressed. Accordingly, the rigidity of the vicinity of the damper attachment section can be increased as a whole. When the rigidity of the vicinity of the damper attachment section can be increased, the rigidity required for the corner reinforcement member is decreased, and additional reduction in size and weight of the corner reinforcement member can be achieved. Accordingly, the rigidity of the vehicle body front structure can be more efficiently increased.

The damper housing reinforcement member may have a ridge portion (for example, a ridge portion (52) of the embodiment) which is protruding toward the inner side of the engine compartment and which is extending in the upward/downward direction.

In this case, the rigidity of the damper input with respect to the load in the upward/downward direction can be increased by the ridge portion formed on the damper housing without forming a large closed cross section. Accordingly, a material required for the reinforcement member can be reduced to achieve reduction in weight. In addition, when the rigidity is increased by the ridge portion of the damper housing, the rigidity required for the corner reinforcement member is decreased, and additional reduction in size and weight of the corner reinforcement member can be achieved. Accordingly, the rigidity of the vehicle body front structure can be more efficiently increased.

The second portion and the fourth portion of the corner reinforcement member may be formed at substantially same position with each other in the vehicle body forward/rearward direction with respect to the ridge portion of the damper housing.

In this case, since the second portion and the fourth portion of the corner reinforcement member and the ridge portion of the damper housing are aligned with each other in the vehicle body width direction, the rigidity in the vehicle body width direction can be further increased. Further, according to this configuration, since the rigidity can be increased without increasing a cross-sectional area or a plate thickness of the reinforcement member, reduction in weight of the vehicle body front structure can be achieved.

The upper dash panel reinforcement member forms a closed cross section together with the upper dash panel joined to the upper dash panel, and the step section of the corner reinforcement member covers a corner portion (for example, a corner portion (17a) of the embodiment) of the closed cross section formed by the upper dash panel reinforcement member and the upper dash panel.

In this case, the step section of the corner reinforcement member extends in the vehicle body width direction and is disposed substantially perpendicular to the damper housing (the damper base). For this reason, the rigidity in the vehicle body width direction can be further increased.

The front side frame, the damper housing reinforcement member, and the corner reinforcement member may be formed on left and right sides as pairs, the vehicle body front structure may include a front sub-frame (for example, a front sub-frame (62) of the embodiment) formed between the pair of front side frames, an annular skeleton (for example, an annular skeleton (61) of the embodiment) may be formed by the pair of damper housing reinforcement members, the pair of corner reinforcement members, the upper dash panel reinforcement member, and the front sub-frame, and the annular skeleton may be fixed to at least one of a floor frame (for example, a floor frame (11) of the embodiment) and a tunnel frame (for example, a tunnel frame (66) of the embodiment) via the front sub-frame.

In this case, the rigidity of the vicinity of the damper housing is increased by the annular skeleton. In addition, as the annular skeleton is fixed to at least one of the floor frame and the tunnel frame, the rigidity of the vehicle body front section can be increased as a whole.

Advantageous Effects of Invention

According to the aspect of the present invention, as the substantially L-shaped step structure that is connected by three or more continuous surfaces is formed by the corner reinforcement member between the damper housing reinforcement member and the upper dash panel reinforcement member that is substantially perpendicular with respect to the damper housing member, the rigidity of the vehicle body front structure can be efficiently increased.

DESCRIPTION OF EMBODIMENTS

Figure 1:
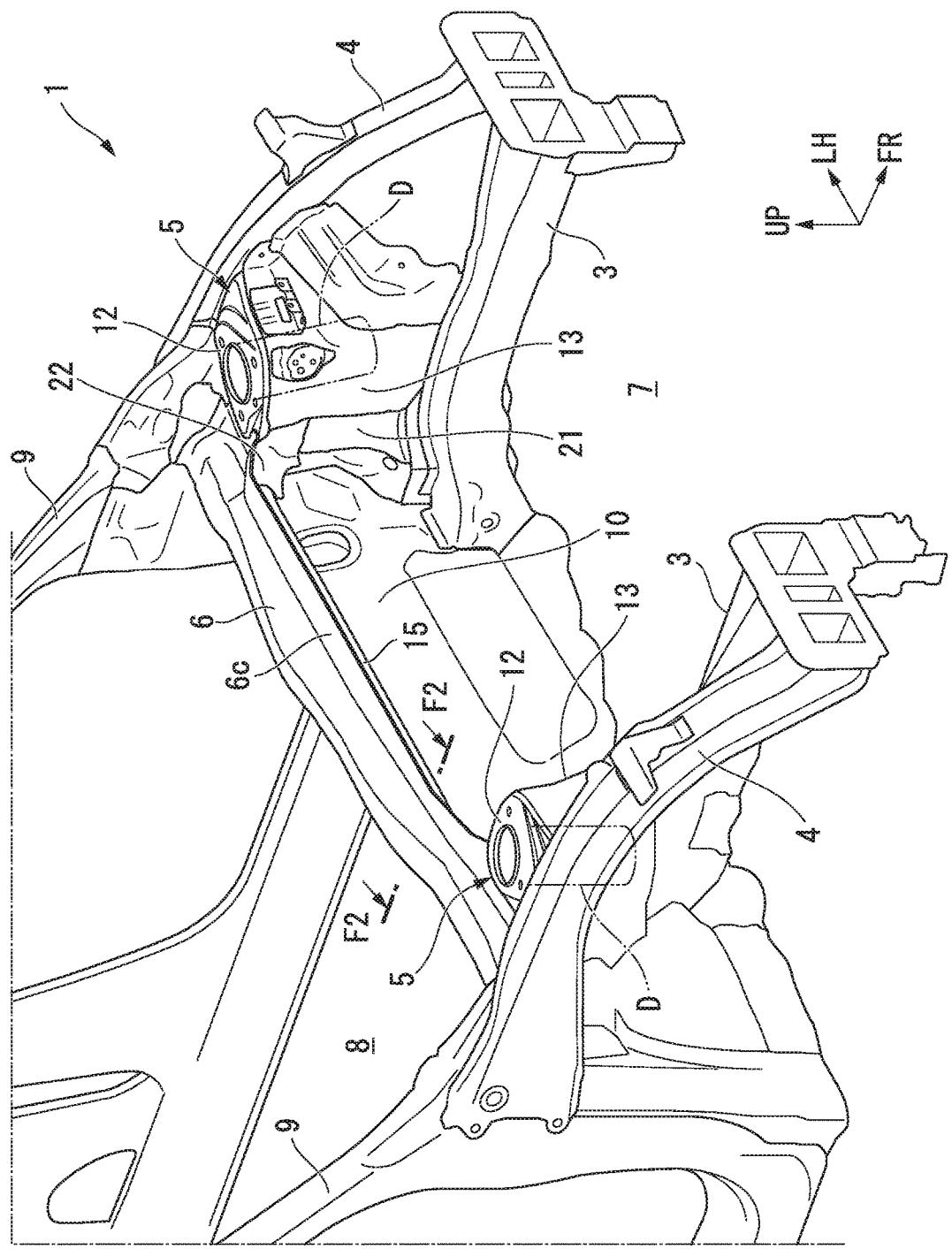
FIG. 1 is a perspective view showing a vehicle body front structure of an embodiment of an aspect of the present invention from diagonally above.

Hereinafter, an embodiment of an aspect of the present invention will be described with reference to the accompanying drawings.

Further, in the drawings, an arrow FR designates a forward side in a vehicle body forward/rearward direction. An arrow LH designates a leftward side in a vehicle body width direction. An arrow UP designates an upward side in an upward/downward direction.

In addition, in the application, "an inner side in the vehicle body width direction" designates an inner side of the vehicle body in the vehicle body width direction (i.e., a side of the center of the vehicle body). In addition, "an outer side in the vehicle body width direction" designates an outer side of the vehicle body in the vehicle body width direction (i.e., a side opposite to a center of the vehicle body).

FIG. 1 shows a skeleton section of a vehicle body front structure 1.

As shown in FIG. 1, the vehicle body front structure 1 includes a pair of front side frames 3, a pair of upper members 4, a pair of damper housings 5, and an upper dash panel 6.

The pair of front side frames 3 are disposed at both sides of an engine compartment 7 in a vehicle body width direction. The front side frames 3 extend forward from below a front section of a passenger compartment 8. Specifically describing, a lower dash panel 10 extending in the vehicle body width direction is installed under the front section of the passenger compartment 8. In addition, a floor frame 11 (see FIG. 9) extending in a vehicle body forward/rearward direction is installed below the passenger compartment 8. The front side frames 3 are joined to the lower dash panel 10, the floor frame 11, and so on.

The pair of upper members 4 are disposed outside the pair of front side frames 3 in the vehicle body width direction. The upper members 4 are joined to front pillars 9, and extend forward from the front pillars 9. The upper members 4 are formed to be curved along contours of front wheels.

The pair of damper housings 5 are disposed at both sides of the engine compartment 7 in the vehicle body width direction. The damper housings 5 support dampers D of a front suspension. The damper housings 5 have damper bases 12 installed on upper end portions of the damper housings 5, and wall surfaces (inner side surfaces) 13 disposed above the front side frames 3 and directed toward an inner side of the engine compartment 7 in the vehicle body width direction. The wall surfaces 13 extend between the front side frames 3 and the damper bases 12 in the upward/downward direction. Lower end portions of the wall surfaces 13 are joined to the front side frames 3.

The upper dash panel 6 is installed between the engine compartment 7 and the passenger compartment 8. The upper dash panel 6 is installed above the front side frames 3. For example, the upper dash panel 6 is disposed at substantially the same height as the damper bases 12 of the damper housings 5.

The upper dash panel 6 extends in the vehicle body width direction and connects the left and right front pillars 9.

An upper dash panel reinforcement member 15 configured to reinforce the upper dash panel 6 is attached to the upper dash panel 6. The upper dash panel reinforcement member 15 extends along, for example, a front surface of the upper dash panel 6 in the vehicle body width direction. The upper dash panel reinforcement member 15 is joined to the pair of damper housings 5 in the vehicle body width direction.

Figure 2:
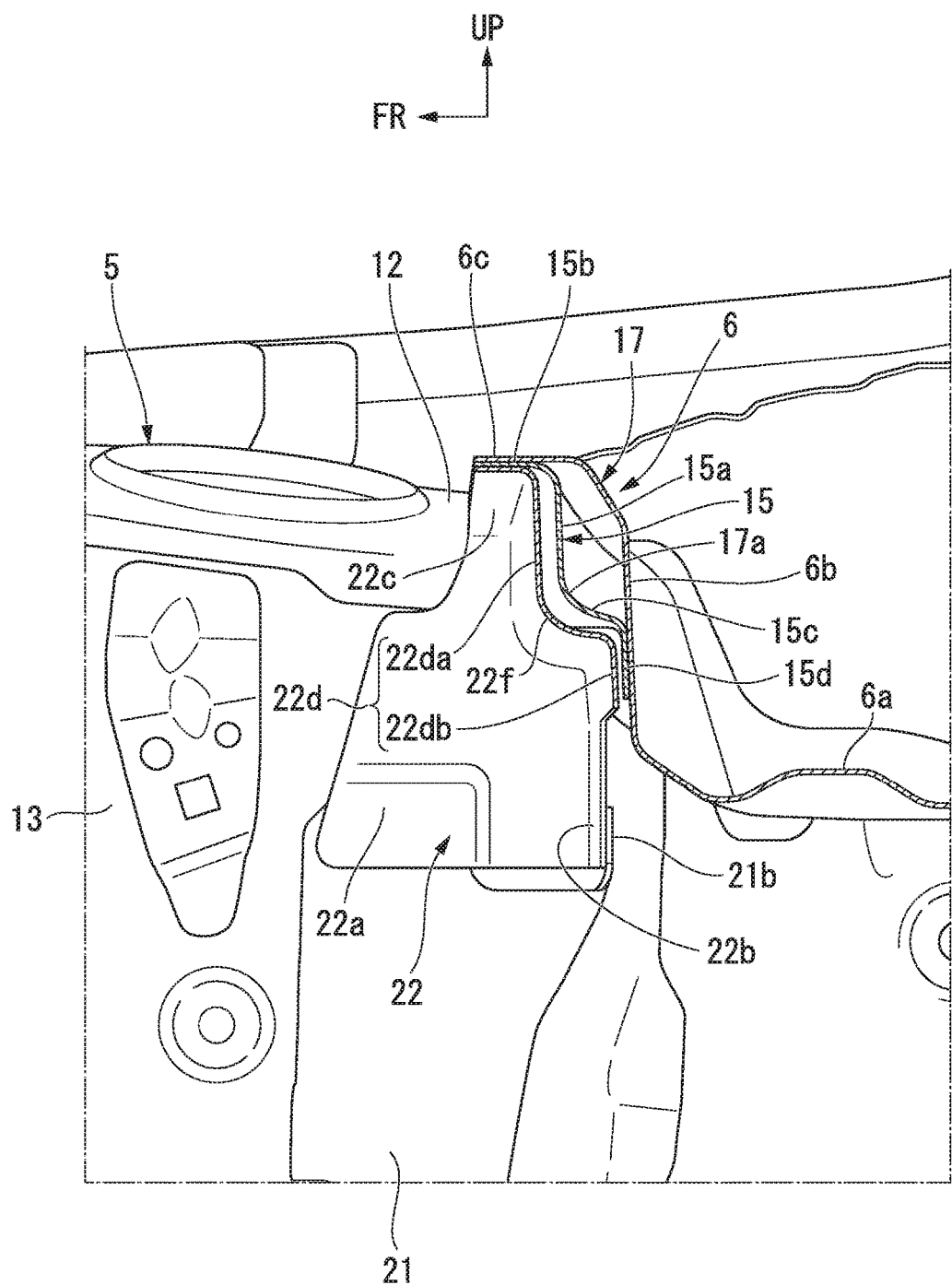
FIG. 2 is a view showing a cross section taken along line F2-F2 of the vehicle body front structure shown in FIG. 1.

FIG. 2 shows a cross section taken along line F2-F2 of the upper dash panel 6 and the upper dash panel reinforcement member 15 shown in FIG. 1.

As shown in FIG. 2, a cross-sectional shape of the upper dash panel 6 includes a bottom wall 6a, an upright section (a front surface section) 6b standing upward from a front edge portion of the bottom wall 6a, and a flange (a horizontal flange) 6c extending forward from an upper end portion of the upright section 6b.

A cross-sectional shape of the upper dash panel reinforcement member 15 includes an upright section 15a, a first flange 15b, a curved section 15c, and a second flange 15d.

The standing section 15a is disposed in front of the upright section 6b of the upper dash panel 6 and extends in the upward/downward direction. A gap is formed between the upright section 15a and the upright section 6b of the upper dash panel 6.

The first flange 15b is formed by being folded forward from the upper end portion of the upright section 15a. The first flange 15b is formed substantially parallel to the flange 6c of the upper dash panel 6. The first flange 15b overlaps below the flange 6c of the upper dash panel 6. The first flange 15b is joined to the flange 6c of the upper dash panel 6.

The curved section 15c extends to be curved from the lower end portion of the upright section 15a toward the upright section 6b of the upper dash panel 6. The rear end portion of the curved section 15c comes in contact with the upright section 6b of the upper dash panel 6.

The second flange 15d is formed by being folded downward from the rear end portion of the curved section 15c. The second flange 15d extends substantially parallel to the upright section 6b of the upper dash panel 6. The second flange 15d overlaps a forward side of the upright section 6b of the upper dash panel 6. The second flange 15d is joined to the upright section 6b of the upper dash panel 6.

The upper dash panel reinforcement member 15 forms a closed cross section 17 together with the upright section 6b and the flange 6c of the upper dash panel 6 as the first flange 15b and the second flange 15d are joined to the upper dash panel 6. A connecting section between the upright section 15a and the curved section 15c of the upper dash panel reinforcement member 15 forms a corner portion 17a of the closed cross section 17. The corner portion 17a extends in the vehicle body width direction.

Next, a structure around the damper housing 5 will be described in detail.

Figure 3:
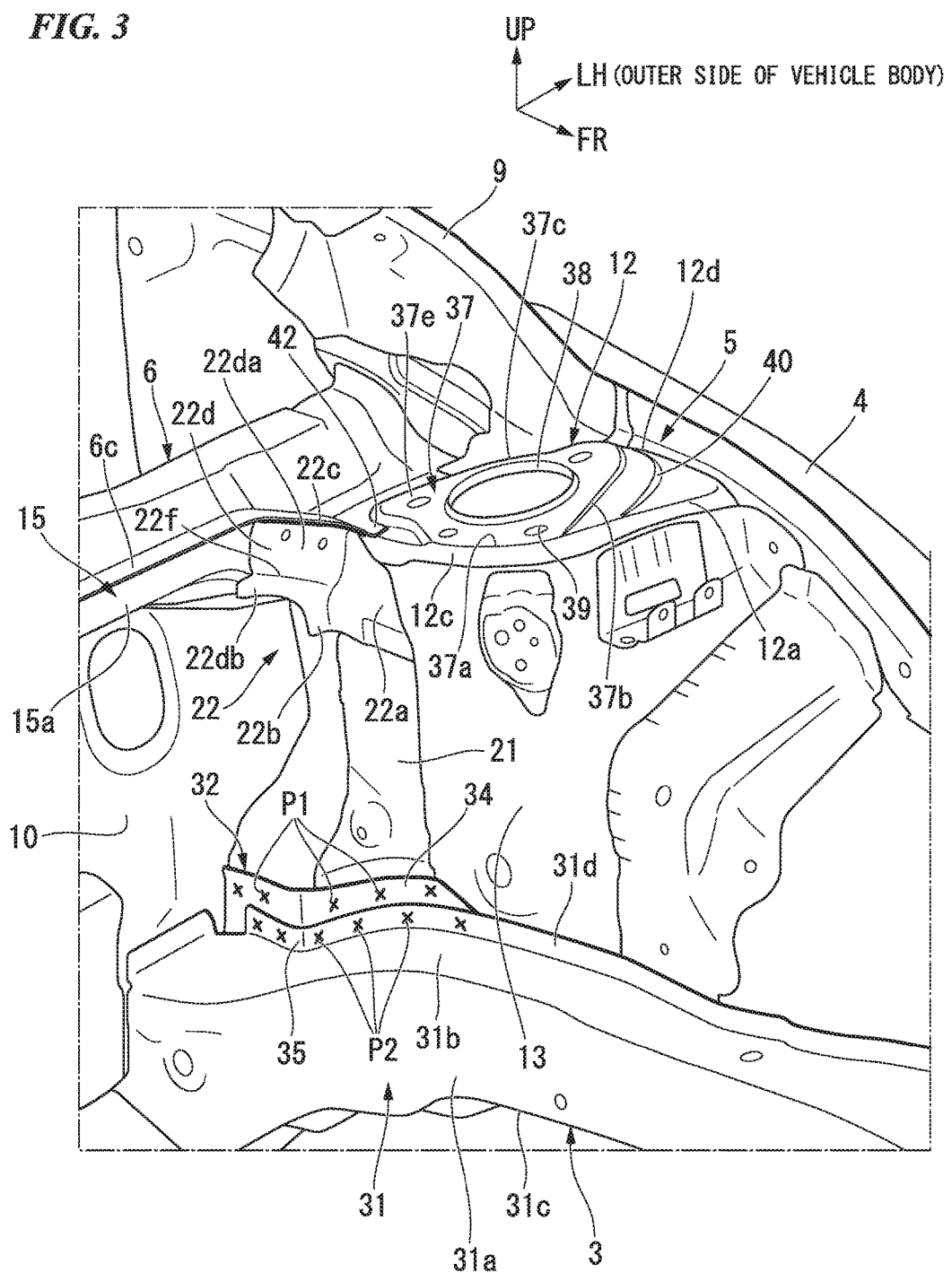
FIG. 3 is a perspective view showing a periphery of a damper housing of the embodiment of the present invention.

FIG. 3 is an enlarged view showing a periphery of the damper housing 5 of a left side of the vehicle body.

As shown in FIG. 3, the vehicle body front structure 1 has a damper housing reinforcement member 21 and a corner reinforcement member 22 that are members configured to reinforce the periphery of the damper housing 5.

The damper housing reinforcement member 21 is attached to the wall surface 13 of the damper housing 5 directed toward the engine compartment 7. The damper housing reinforcement member 21 extends along the wall surface 13 of the damper housing 5 in the upward/downward direction. The damper housing reinforcement member 21 is a plate-shaped member including a portion along the wall surface 13 of the damper housing 5. Specifically describing, the damper housing reinforcement member 21 has a first portion 21a and a second portion 21b (see FIG. 4). The first portion 21a extends along the wall surface 13 of the damper housing 5 in the vehicle body forward/rearward direction. The second portion 21b is formed to be folded from the rear end portion of the first portion 21a in the vehicle body forward/rearward direction and extends in the vehicle body width direction. The first portion 21a and the second portion 21b are joined to the damper housing 5. Accordingly, a closed cross section is formed by the damper housing 5 and the damper housing reinforcement member 21.

As shown in FIG. 3, a lower end portion of the damper housing reinforcement member 21 is joined to the front side frame 3. Further, a joining structure between the lower end portion of the damper housing reinforcement member 21 and the front side frame 3 will be described below. Meanwhile, the upper end portion of the damper housing reinforcement member 21 is connected to the upper dash panel reinforcement member 15 via the corner reinforcement member 22 (to be described below).

Figure 4:
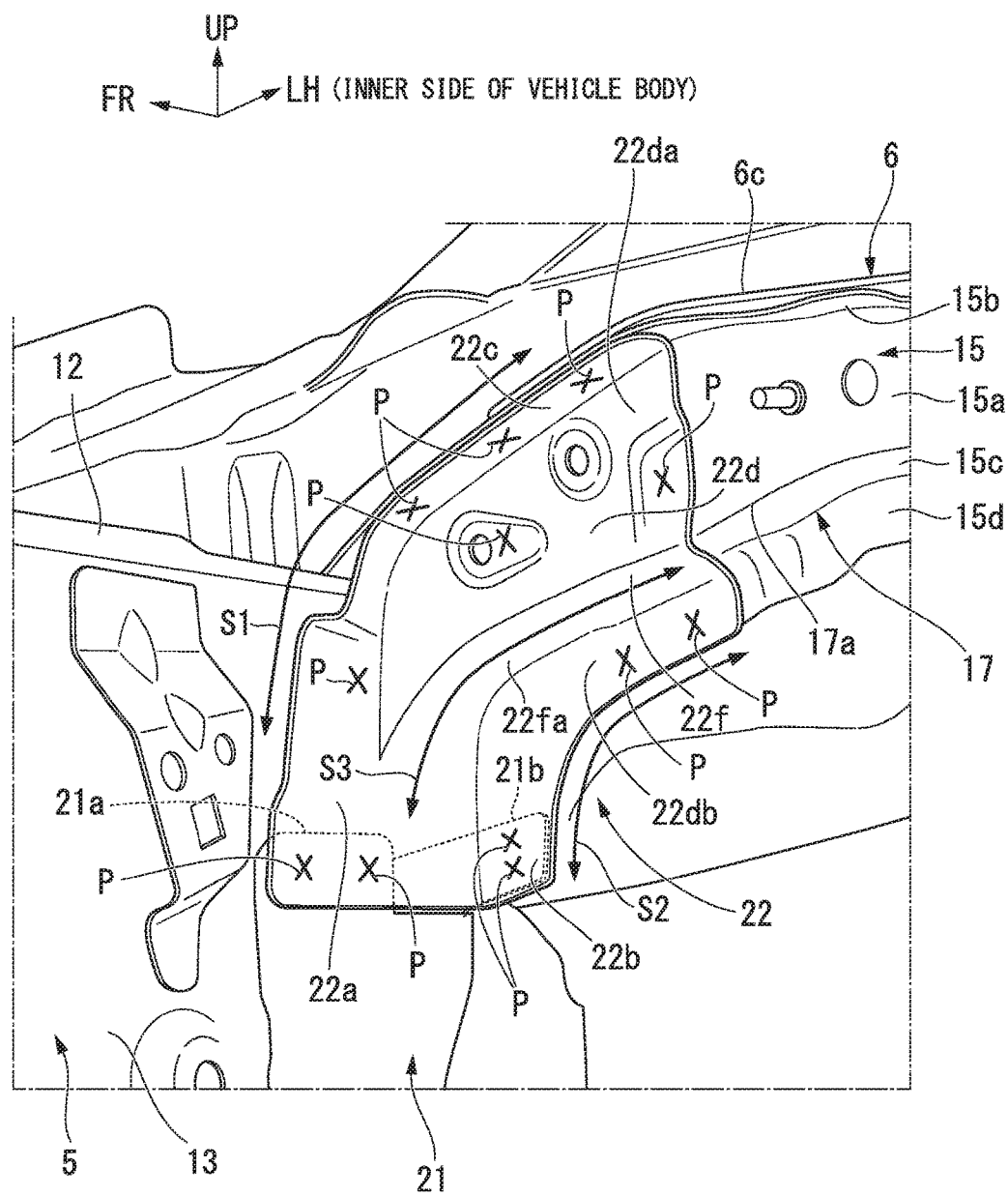
FIG. 4 is a perspective view showing a corner reinforcement member of the embodiment of the aspect of the present invention.

FIG. 4 is an enlarged view showing the corner reinforcement member 22 of a right side of the vehicle body.

As shown in FIG. 4, the corner reinforcement member 22 is installed on a corner portion formed by the upper end portion of the damper housing reinforcement member 21 and the upper dash panel reinforcement member 15. The corner reinforcement member 22 is joined to the upper end portion of the damper housing reinforcement member 21 and the end portion (the right end portion or the left end portion) of the upper dash panel reinforcement member 15 in the vehicle body width direction, and connects the upper end portion of the damper housing reinforcement member 21 and the upper dash panel reinforcement member 15. The corner reinforcement member 22 is a member having a substantially L-shaped cross section. Specifically describing, the corner reinforcement member 22 has a first portion 22a, a second portion 22b, a third portion 22c, and a fourth portion 22d.

The first portion 22a is a wall section (an outer side surface) extending in the upward/downward direction and directed outward in the vehicle body width direction. In other words, the first portion 22a is a wall section formed in the vehicle body forward/rearward direction. The first portion 22a faces the first portion 21a of the damper housing reinforcement member 21 in the vehicle body width direction and extends along the first portion 21a of the damper housing reinforcement member 21. The first portion 22a is joined to the first portion 21a of the damper housing reinforcement member 21 on the upper end portion of the damper housing reinforcement member 21 by welding (for example, spot welding). Further, reference character P in FIG. 4 designates an example of a position of joining by welding on the corner reinforcement member 22. For example, the first portion 22a, the first portion 21a of the damper housing reinforcement member 21, and the damper housings 5 are integrally joined in the first portion 22a.

The second portion 22b is disposed at substantially the same height as the first portion 22a and extends in a direction crossing (for example, substantially perpendicular to) the first portion 22a. Specifically describing, the second portion 22b extends from the rear end portion of the first portion 22a in the vehicle body forward/rearward direction toward the inside in the vehicle body width direction. Specifically, the second portion 22b is formed by being folded from the rear end portion of the first portion 22a toward the inside in the vehicle body width direction. The second portion 22b forms the wall section in the vehicle body width direction.

The second portion 22b faces the second portion 21b of the damper housing reinforcement member 21 in the vehicle body forward/rearward direction and extends along the second portion 21b of the damper housing reinforcement member 21. The second portion 22b is joined to the second portion 21b of the damper housing reinforcement member 21 in the upper end portion of the damper housing reinforcement member 21 by welding (for example, spot welding).

According to the above-mentioned configuration, a substantially L-shaped cross section is formed in the corner reinforcement member 22 by the first portion 22a and the second portion 22b.

The third portion 22c is disposed on the upper end portion of the corner reinforcement member 22. The third portion 22c extends from the upper end portion of the first portion 22a toward the inside in the vehicle body width direction. The third portion 22c is a wall section (an upper surface) directed upward. In other words, the third portion 22c is a wall section in the vehicle body forward/rearward direction. The third portion 22c faces toward below the first flange 15b of the upper dash panel reinforcement member 15 and extends along the first flange 15b of the upper dash panel reinforcement member 15. The third portion 22c is joined to the first flange 15b of the upper dash panel reinforcement member 15 by welding (for example, spot welding). For example, the third portion 22c, the first flange 15b of the upper dash panel reinforcement member 15 and the flange 6c of the upper dash panel 6 are integrally joined in the third portion 22c.

The fourth portion 22d is disposed at substantially the same position as the third portion 22c in the vehicle body width direction and extends in a direction crossing (for example, substantially perpendicular to) the third portion 22c. Specifically, describing, the fourth portion 22d extends downward from the rear end portion of the third portion 22c in the vehicle body forward/rearward direction. Specifically, the fourth portion 22d is formed by being folded downward from the rear end portion of the third portion 22c. The fourth portion 22d forms a wall section in the vehicle body width direction, like the second portion 22b. The fourth portion 22d is disposed at substantially the same position as the second portion 22b in the vehicle body forward/rearward direction.

According to the above-mentioned configuration, a substantially L-shaped cross section is formed in the corner reinforcement member 22 by the third portion 22c and the fourth portion 22d.

Here, the fourth portion 22d will be described more specifically.

As shown in FIG. 4, the fourth portion 22d includes a first region 22da and a second region 22db.

The first region 22da is formed in the vicinity of the third portion 22c of the corner reinforcement member 22.

The first region 22da is a wall section extending in the upward/downward direction and formed in the vehicle body width direction. The first region 22da extends along the upright section 15a of the upper dash panel reinforcement member 15.

The first region 22da is joined to the upright section 15a of the upper dash panel reinforcement member 15 by welding (for example, spot welding).

The second region 22db is formed below the first region 22da. The second region 22db is a wall section extending substantially parallel to the first region 22da. The second region 22db is displaced to the rear of the vehicle body from the first region 22da. The second region 22db extends along the second flange 15d of the upper dash panel reinforcement member 15. The second region 22db is joined to the second flange 15d of the upper dash panel reinforcement member 15 by welding (for example, spot welding). For example, the second region 22db, the second flange 15d of the upper dash panel reinforcement member 15 and the upright section 6b of the upper dash panel 6 are integrally joined in the second region 22db.

A step section 22f is formed between the first region 22da and the second region 22db.

As shown in FIG. 2, the step section 22f covers the corner portion 17a of the closed cross section 17 formed by the upper dash panel reinforcement member 15 and the upper dash panel 6. The step section 22f extends in the vehicle body width direction. For example, the step section 22f is formed on the fourth portion 22d throughout the width in the vehicle body width direction. The step section 22f has a bottom surface 22fa directed downward. The bottom surface 22fa is a surface formed in the vehicle body forward/rearward direction and extends in the vehicle body width direction.

In the corner reinforcement member 22 as described above, as shown in FIG. 4, the first portion 22a and the third portion 22c are formed to be connected to each other. In other words, the first portion 22a and the third portion 22c are formed as one continuous surface. Accordingly, a continuous surface (see an arrow S1) continuous from the first portion 21a of the damper housing reinforcement member 21 to the first flange 15b of the upper dash panel reinforcement member 15 via the first portion 22a and the third portion 22c of the corner reinforcement member 22 is formed.

Similarly, the second portion 22b and the fourth portion 22d (the second region 22db) are formed to be continuous with each other. In other words, the second portion 22b and the fourth portion 22d are formed as one continuous surface. Accordingly, a continuous surface (see an arrow S2) continuous from the second portion 21b of the damper housing reinforcement member 21 to the second flange 15d of the upper dash panel reinforcement member 15 via the second portion 22b and the fourth portion 22d of the corner reinforcement member 22 is formed.

In addition, the first portion 22a and the bottom surface 22fa of the step section 22f are formed to be continuous with each other.

In other words, the first portion 22a and the bottom surface 22fa of the step section 22f are formed as one continuous surface. Accordingly, a continuous surface (see an arrow S3) continuous from the first portion 21a of the damper housing reinforcement member 21 to the upper dash panel reinforcement member 15 via the first portion 22a of the corner reinforcement member 22 and the bottom surface 22fa of the step section 22f is formed.

Accordingly, a substantially L-shaped step structure that connects at least three surfaces (that is constituted by at least three continuous surfaces) is formed between the damper housing reinforcement member 21 and the upper dash panel reinforcement member 15 substantially perpendicular to the damper housing 5.

Next, a joining structure between the damper housing reinforcement member 21 and the front side frame 3 will be described in detail.

Figure 5:
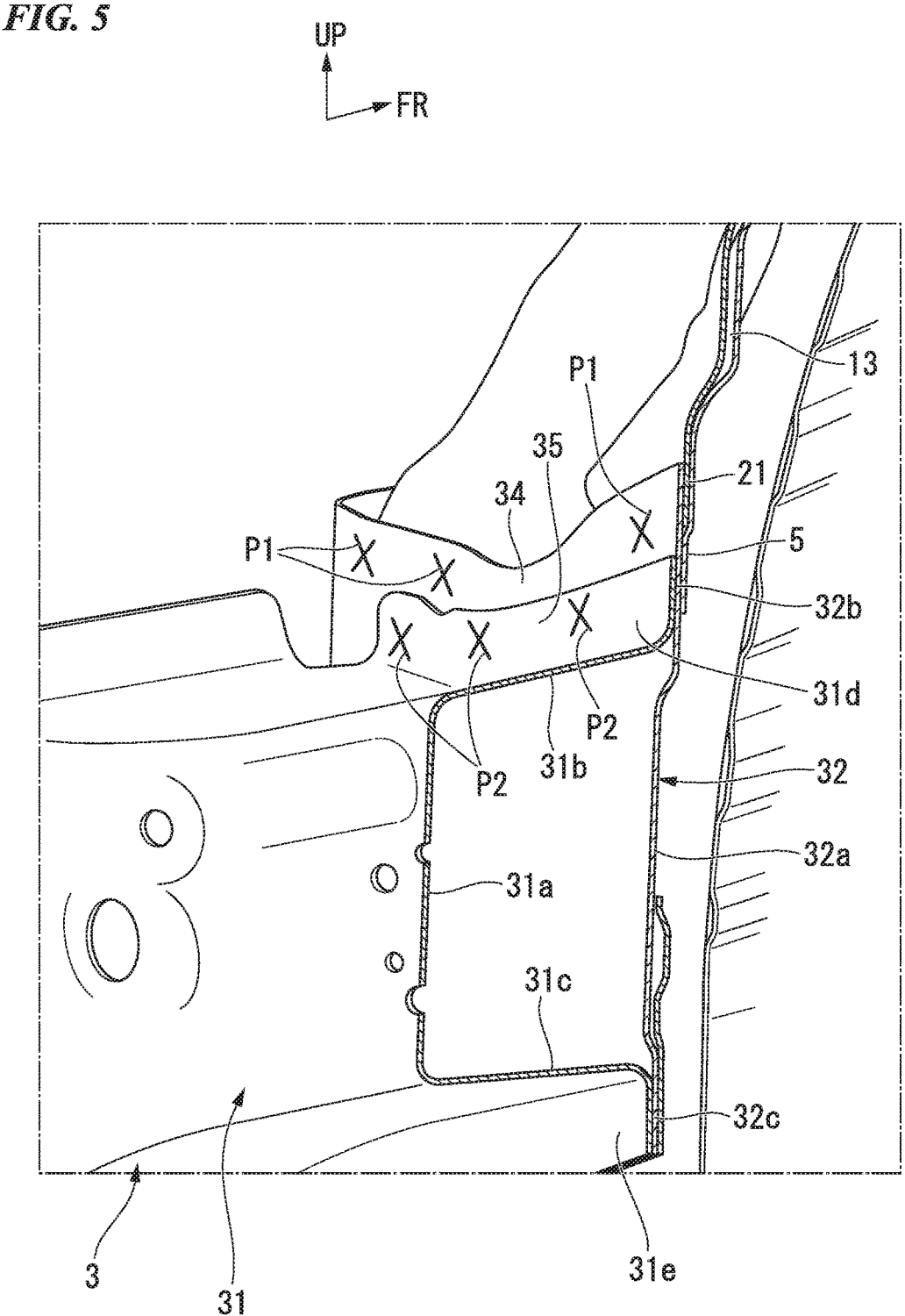
FIG. 5 is a view showing a cross section of a front side frame of the embodiment of the aspect of the present invention.

FIG. 5 shows a configuration of the front side frame 3.

As shown in FIG. 5, the front side frame 3 has an inner panel 31 and an outer panel 32.

The inner panel 31 has a standing wall 31a, an upper wall 31b and a lower wall 31c. The standing wall 31a extends in the upward/downward direction at a position separated from the outer panel 32. The upper wall 31b extends from the upper end portion of the standing wall 31a toward the outer panel 32. The lower wall 31c extends from the lower end portion of the standing wall 31a toward the outer panel 32.

The inner panel 31 further has an upper flange 31d and a lower flange 31e. The upper flange 31d extends upward from the end portion of the upper wall 31b disposed at a side opposite to the standing wall 31a. The lower flange 31e extends downward from the end portion of the lower wall 31c disposed at a side opposite to the standing wall 31a.

The outer panel 32 is a wall section extending in the upward/downward direction. The outer panel 32 is disposed on the outer side in the vehicle body width direction with respect to the inner panel 31 and adjacent to the damper housing 5. The outer panel 32 has a standing wall 32a, an upper flange 32b formed on the upper end portion of the standing wall 32a, and a lower flange 32c formed on the lower end portion of the standing wall 32a. The standing wall 32a is disposed substantially parallel to the standing wall 31a of the inner panel 31. The upper flange 32b of the outer panel 32 is formed substantially parallel to the upper flange 31d of the inner panel 31. The upper flange 32b of the outer panel 32 overlaps the upper flange 31d of the inner panel 31 and is joined to the upper flange 31d. The lower flange 32c of the outer panel 32 is formed substantially parallel to the lower flange 31e of the inner panel 31. The lower flange 32c of the outer panel 32 overlaps the lower flange 31e of the inner panel 31 and is joined to the lower flange 31e. Accordingly, the outer panel 32 is joined to the inner panel 31 and forms a closed cross section together with the inner panel 31.

As shown in FIG. 5, the outer panel 32 has an extension portion 34. The extension portion 34 extends above a joint portion 35 which is between the upper flange 32b of the outer panel 32 and the upper flange 31d of the inner panel 31. The extension portion 34 faces the damper housing reinforcement member 21 and the damper housing 5 in the vehicle body width direction.

As shown in FIG. 3, the extension portion 34 of the outer panel 32 extends forward from a rear side of the damper housing reinforcement member 21 in the vehicle body forward/rearward direction. The lower end portion of the damper housing reinforcement member 21 is joined to the extension portion 34 of the outer panel 32 together with the damper housing 5.

Specifically describing, a mark x in FIG. 3 designates a spot welding dot. As shown in FIG. 3, a plurality of spot welding dots P1 are formed on the extension portion 34 of the outer panel 32. In the dots P1, the extension portion 34 of the outer panel 32, the damper housing reinforcement member 21, and the damper housing 5 are integrally joined by spot welding.

Meanwhile, a plurality of spot welding dots P2 are also formed on the joint portion 35 between the upper flange 31d of the inner panel 31 and the upper flange 32b of the outer panel 32. In the dots P2, the upper flange 31d of the inner panel 31, the upper flange 32b of the outer panel 32, and the damper housings 5 are integrally joined by spot welding. In other words, the damper housing 5 is joined to the front side frame 3 at two upper and lower rows at dots.

In addition, as shown in FIG. 3, the plurality of spot welding dots P1 formed on the extension portion 34 of the outer panel 32 and the plurality of spot welding dots P2 formed on the joint portion 35 between the inner panel 31 and the outer panel 32 are disposed in a zigzag manner in the vehicle body forward/rearward direction. That is, the plurality of dots P1 and the plurality of dots P2 are disposed so as to be deviated from each other in the vehicle body forward/rearward direction and such that the dots P1 and the dots P2 are alternately disposed in the vehicle body forward/rearward direction. Accordingly, the plurality of dots P1 and P2 can be relatively densely disposed.

Next, the damper base 12 of the damper housing 5 will be described in detail.

Figure 6:
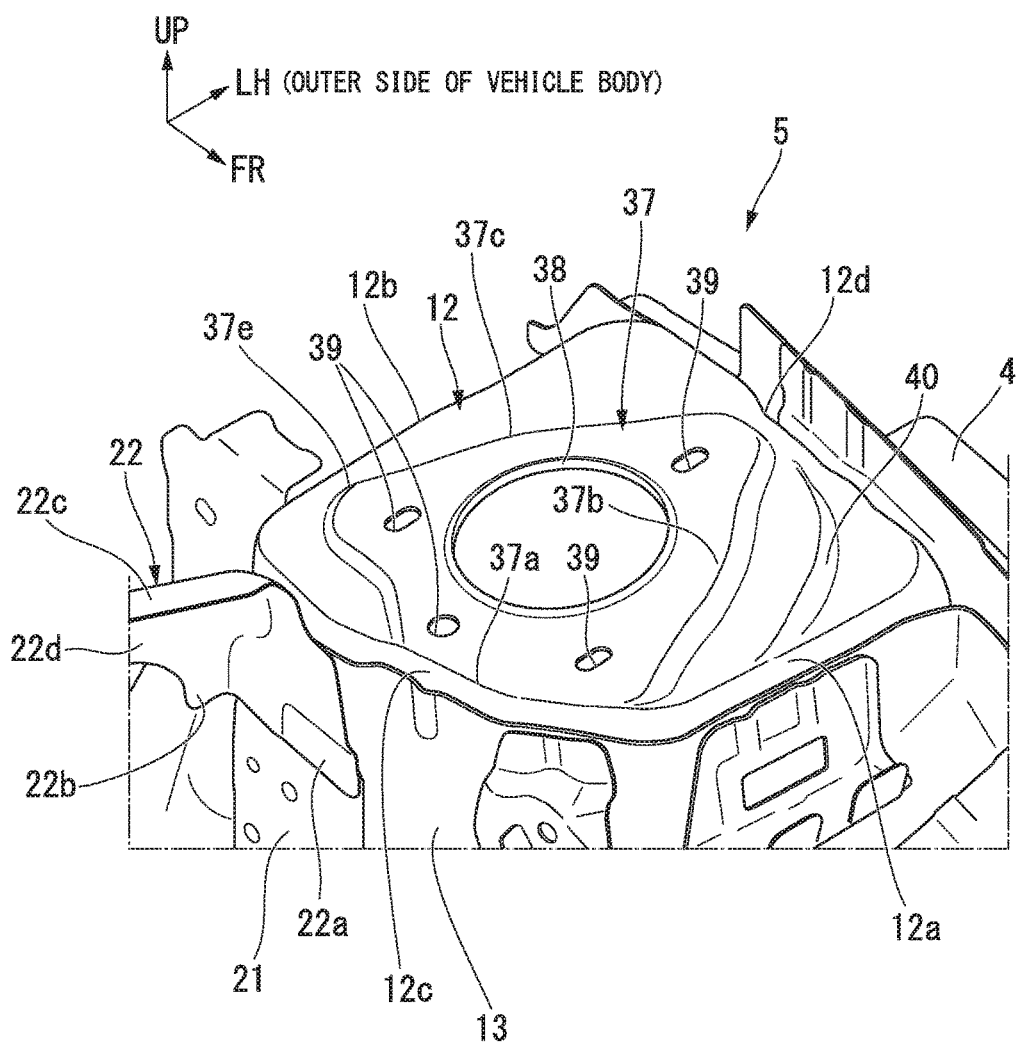
FIG. 6 is a perspective view showing a damper base of the embodiment of the aspect of the present invention.

FIG. 6 shows the damper base 12 of the damper housing 5.

As shown in FIG. 6, the damper base 12 is formed in a substantially rectangular shape when seen in a plan view. As described above, the damper base 12 is a portion that forms the upper end portion of the damper housing 5. The damper base 12 has a front edge portion 12a, a rear edge portion 12b, a first side edge portion 12c, and a second side edge portion 12d.

The front edge portion 12a and the rear edge portion 12b are disposed to be separated from each other in the vehicle body forward/rearward direction and extend in the vehicle body width direction. The first side edge portion 12c is an edge portion of the damper bases 12 on the inner side in the vehicle body width direction. The first side edge portion 12c extends along the upper end portion of the wall surface 13 of the damper housing 5 in the vehicle body forward/rearward direction. The second side edge portion 12d is an edge portion of the damper base 12 on the outer side in the vehicle body width direction. The second side edge portion 12d extends along the upper member 4 in the vehicle body forward/rearward direction.

As shown in FIG. 6, the damper base 12 has a damper attachment section (a damper seat surface section) 37 of the damper base 12 that is formed higher by one level. The damper attachment section 37 has an opening section 38 through which a shaft section of the damper D passes, and a hole 39 through which a fixing member (for example, a bolt) that fixes the damper D passes. The damper attachment section 37 is formed in a substantially triangular shape when seen in a plan view. Further, in the application, "a substantially triangular shape" includes a triangular shape having an arc-shaped corner portion and an arc-shaped side.

For example, the damper attachment section 37 having a substantially triangular shape is disposed to protrude outward in the vehicle body width direction when seen in a plan view. Specifically describing, the damper attachment section 37 has a first side 37a, a second side 37b, and a third side 37c. The first side 37a extends along the first side edge portion 12c of the damper base 12. The second side 37b extends diagonally rearward from the front end portion of the first side 37a toward the on the outer side in the vehicle body width direction. The third side 37c extends diagonally forward from the rear end portion of the first side 37a toward the on the outer side in the vehicle body width direction. The third side 37c extends between the first side 37a and the second side 37b and connects between the first side 37a and the second side 37b.

As shown in FIG. 6, a ridge portion 40 is formed in a region between the front edge portion 12a of the damper base 12 and the damper attachment section 37. The ridge portion 40 is a step portion formed on the upper surface of the damper base 12 to form a step difference in the upward/downward direction. The ridge portion 40 extends along at least a portion of the contour of the damper base 12. In the embodiment, the ridge portion 40 extends along the second side 37b of the damper attachment section 37. Accordingly, the rigidity of the region between the front edge portion 12a of the damper base 12 and the damper attachment section 37 is increased.

Meanwhile, as shown in FIG. 3, a rear end portion 37e of the damper attachment section 37 is joined to the upper dash panel 6. Specifically describing, the upper dash panel 6 has an overhanging section 42 that overhangs forward toward the damper attachment section 37. The overhanging section 42 has a shape corresponding to a contour of the damper attachment section 37 when seen in a plan view. The overhanging section 42 overlaps above the damper base 12. The overhanging section 42 is joined to the rear end portion of the damper attachment section 37. In other words, the region between the rear edge portion 12b of the damper base 12 and the damper attachment section 37 is covered with the overhanging section 42 of the upper dash panel 6 and the rigidity is increased by the overhanging section 42.

Next, a ridge portion 52 formed on the damper housing reinforcement member 21 will be described.

Figure 7:
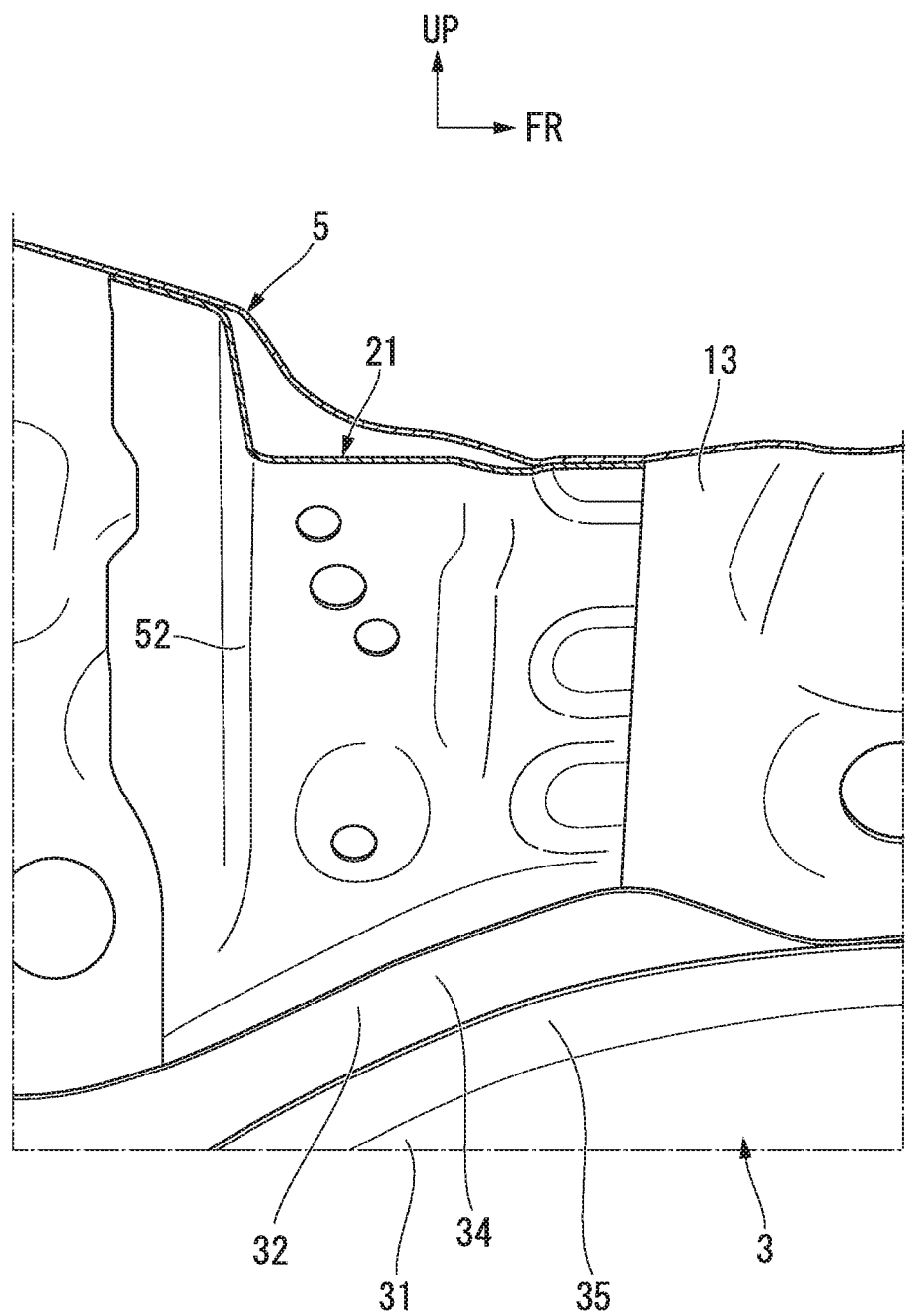
FIG. 7 is a view showing a cross section of the damper housing of the embodiment of the aspect of the present invention from diagonally above.

FIG. 7 shows the ridge portion 52 formed on the damper housing reinforcement member 21.

As shown in FIG. 7, the damper housing reinforcement member 21 has the ridge portion 52 protruding inward in the vehicle body width direction (i.e., toward an inner side of the engine compartment 7). The ridge portion 52 extends in the upward/downward direction. For example, the ridge portion 52 extends between the vicinity of the corner reinforcement member 22 and the vicinity of the front side frame 3 in the upward/downward direction. Accordingly, the rigidity of the vehicle body front structure 1 in the upward/downward direction is increased.

Figure 8:
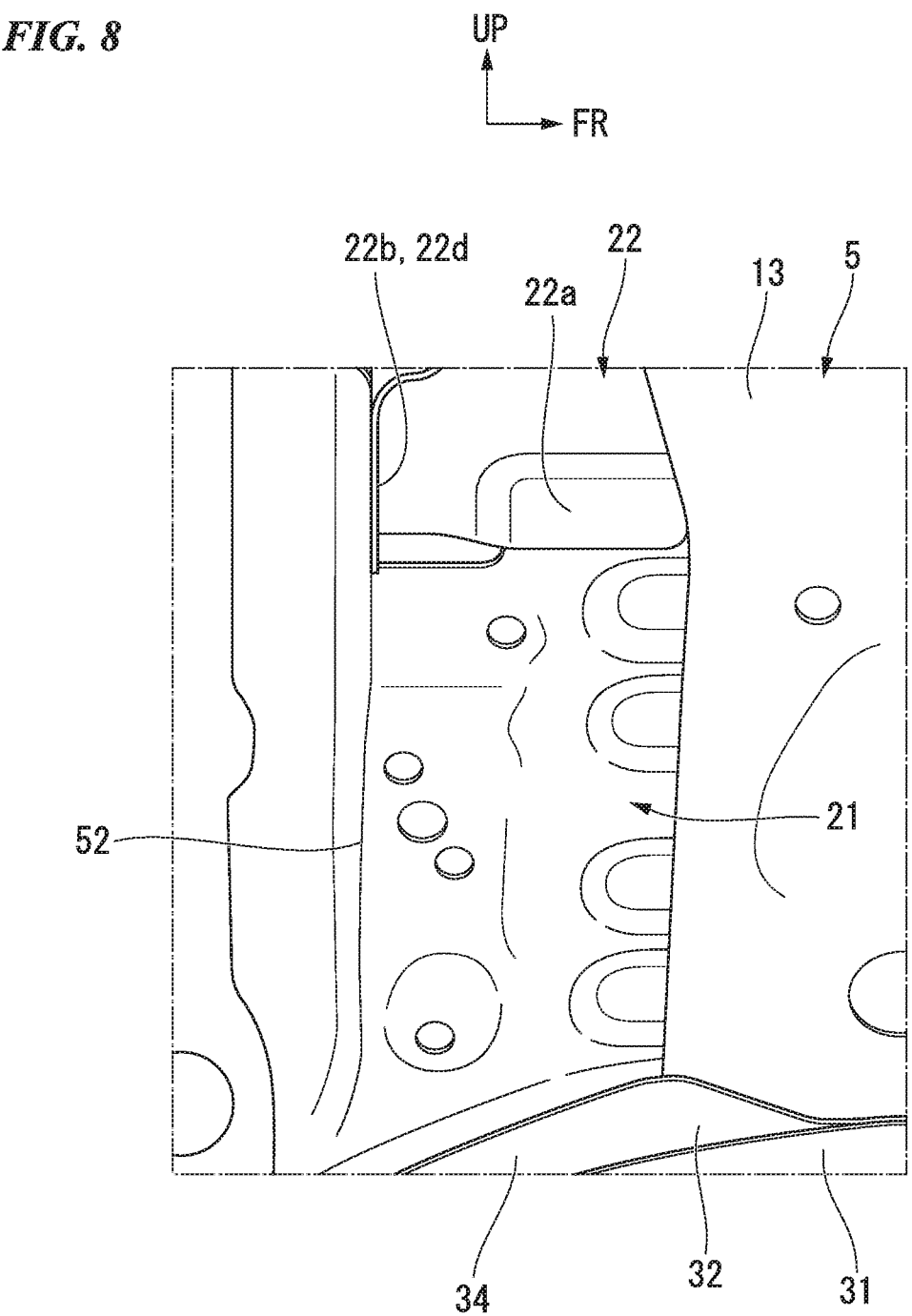
FIG. 8 is a side view showing an inner side of the vehicle body front structure of the embodiment of the aspect of the present invention.

FIG. 8 is a side view showing the inner side of the vehicle body front structure 1 when seen from the inside in the vehicle body width direction.

Further, in FIG. 8, for the convenience of description, illustration of the upper dash panel 6 and the upper dash panel reinforcement member 15 will be omitted.

As shown in FIG. 8, the second portion 22b and the fourth portion 22d of the corner reinforcement member 22 are formed at substantially the same position in the vehicle body forward/rearward direction with respect to the ridge portion 52 of the damper housing reinforcement member 21. In other words, the second portion 22b and the fourth portion 22d of the corner reinforcement member 22 and the ridge portion 52 of the damper housing reinforcement member 21 are aligned with each other in the vehicle body width direction.

Accordingly, the rigidity of the vehicle body front structure 1 in the vehicle body width direction is increased.

Next, an annular skeleton 61 installed on the vehicle body front structure 1 will be described.

Figure 9:
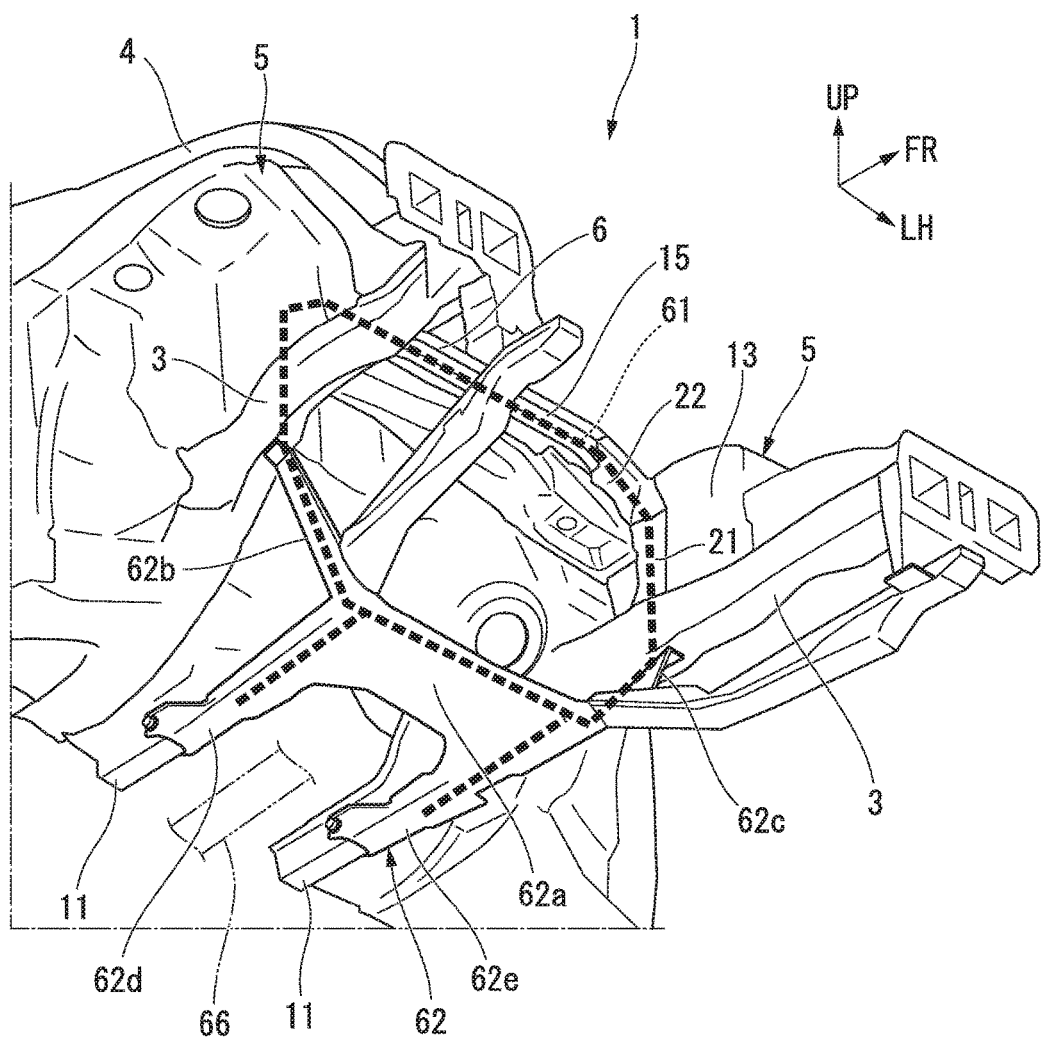
FIG. 9 is a perspective view showing the vehicle body front structure of the embodiment of the aspect of the present invention from diagonally below.

FIG. 9 shows the annular skeleton 61 installed on the vehicle body front structure 1.

As shown in FIG. 9, the vehicle body front structure 1 includes the front side frames 3, the damper housing reinforcement members 21, and the corner reinforcement members 22, which are installed at left and right sides as a pairs.

The vehicle body front structure 1 further includes a front sub-frame 62 that extends between the pair of front side frames 3. Specifically describing, the front sub-frame 62 has a base section 62a, a first connecting section 62b, a second connecting section 62c, a third connecting section 62d, and a fourth connecting section 62e.

The base section 62a is disposed below the front side frames 3. The base section 62a extends between the pair of front side frames 3 in the vehicle body width direction. The base section 62a has a first end portion and a second end portion as end portions of the base section 62a in the vehicle body width direction.

The first connecting section 62b extends from the first end portion of the base section 62a toward one of the front side frames 3. The first connecting section 62b connects the first end portion of the base section 62a and the front side frame 3.

Figure 10:
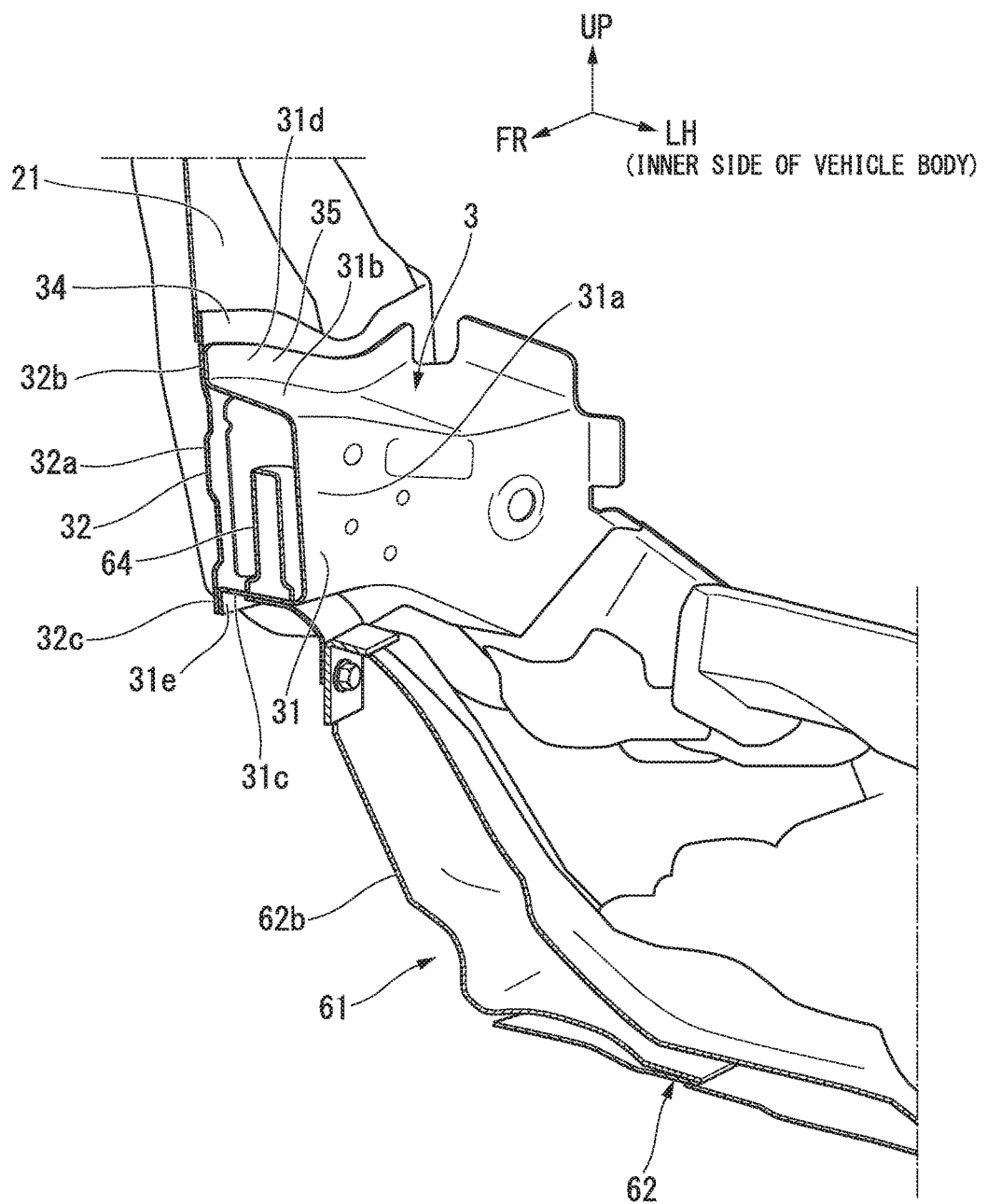
FIG. 10 is a view showing a cross section of a portion of an annular skeleton of the embodiment of the aspect of the present invention.

FIG. 10 specifically shows a connecting section between the first connecting section 62b and the front side frame 3.

As shown in FIG. 10, a fixing member 64 is accommodated between the inner panel 31 and the outer panel 32 of the front side frame 3. The first connecting section 62b is fixed to the front side frame 3 by being fixed to the fixing member 64. In addition, the first connecting section 62b is connected to the damper housing reinforcement member 21 via the front side frame 3 by being fixed to the fixing member 64.

As shown in FIG. 9, the second connecting section 62c extends from the second end portion of the base section 62a toward the other front side frame 3. The second connecting section 62c connects the second end portion of the base section 62a and the front side frame 3. Further, a configuration of the connecting section between the second connecting section 62c and the front side frame 3 is substantially the same as that of the connecting section between the first connecting section 62b and the front side frame 3. That is, the second connecting section 62c is connected to the damper housing reinforcement member 21 via the front side frame 3 by being fixed to the fixing member 64.

The third connecting section 62d and the fourth connecting section 62e extend rearward from the first and second end portions of the base section 62a. The third connecting section 62d and the fourth connecting section 62e are connected to the floor frame 11. Further, instead of the floor frame 11 or in addition to the floor frame 11, the front sub-frame 62 may be connected to a tunnel frame 66. Here, the floor frame 11 is a member extending from below the passenger compartment 8 in the vehicle body forward/rearward direction to form a skeleton of a lower section of the passenger compartment. In addition, the tunnel frame 66 is a member extending in the vehicle body forward/rearward direction and forming a floor tunnel in the passenger compartment 8. Each of the floor frame 11 and the tunnel frame 66 is an example of the frame member extending behind the upper dash panel 6 in the vehicle body forward/rearward direction.

As shown in FIG. 9, the annular skeleton 61 that surrounds upper, lower, left and right sides of the engine compartment 7 is formed by the pair of damper housing reinforcement members 21, the pair of corner reinforcement members 22, the upper dash panel reinforcement member 15, and the front sub-frame 62. The annular skeleton 61 is fixed to at least one of the floor frame 11 and the tunnel frame 66 via the front sub-frame 62. Accordingly, the rigidity of the vehicle body front structure 1 is increased.

The corner reinforcement member 22 of the vehicle body front structure 1 according to the above-mentioned embodiment has the first portion 22a, the second portion 22b, the third portion 22c, and the fourth portion 22d, together with the step section 22f having substantially an L shape. The first portion 22a faces the damper housing reinforcement member 21 in the vehicle body width direction and is joined to the damper housing reinforcement member 21. The second portion 22b extends from the rear end portion of the first portion 22a toward the inner side of the vehicle body in the vehicle body width direction. The third portion 22c faces the upper dash panel reinforcement member 15 from below and is joined to the upper dash panel reinforcement member 15. The fourth portion 22d extends downward from the rear end portion of the third portion 22c. The first portion 22a and the third portion 22c are formed as a continuous surface. The second portion 22b and the fourth portion 22d are formed as a continuous surface. The bottom surface 22fa of the step section 22f and the first portion 22a are formed as a continuous surface.

For this reason, a substantially L-shaped step structure that is connected by at least three continuous surfaces, instead of a substantially L-shaped step structure that is connected by one surface (constituted by one continuous surface), is formed between the damper housing reinforcement member 21 and the upper dash panel reinforcement member 15 which is substantially perpendicular to the damper housing reinforcement member 21. For this reason, the corner reinforcement member 22 can respond to not only a load of a damper input in the upward/downward direction (a load in one direction) but also a load of a damper input in the vehicle body forward/rearward direction and a load in the vehicle body width direction by distributing the load.

Accordingly, for example, an effect such as installation of an assembly tower bar can be exhibited. For this reason, the rigidity around the damper housing 5 can also be increased by the corner reinforcement member 22 having a relatively light weight. Accordingly, the rigidity of the vehicle body front structure 1 can be efficiently increased.

Further, according to this configuration of the embodiment, the lower end portion of the damper housing reinforcement member 21 is joined to the front side frame 3. For this reason, the rigidity of the vehicle body front structure 1 can be further increased.

In addition, according to this configuration, since the corner reinforcement member 22 is relatively small, the probability of generating a portion in which joining (welding) in the vehicle body front structure is difficult can be decreased.

In the embodiment, the outer panel 32 of the front side frame 3 has the extension portion 34 extending above the joint portion 35 between the outer panel 32 and the inner panel 31, and the lower end portion of the damper housing reinforcement member 21 is joined to the extension portion 34 of the outer panel 32 together with the damper housing 5.

According to the configuration, the spot welding dots P1 and P2 can be formed at the two upper and lower rows at the joint portion 35 between the outer panel 32 and the inner panel 31 and the extension portion 34 of the outer panel 32. Accordingly, the rigidity of the damper housing 5 with respect to a falling-down behavior can be further increased.

In addition, according to this configuration, in the two upper and lower rows at the joint portion 35 between the outer panel 32 and the inner panel 31 and the extension portion 34 of the outer panel 32, the welding dots P1 and P2 can be formed in a zigzag manner. When the welding dots P1 and P2 can be formed in a zigzag manner, the dots can be densely disposed in comparison with the case in which the welding dots are formed a row. When the welding dots can be densely disposed, a coupling strength between the damper housing 5 and the front side frame 3 can be further increased. Accordingly, the rigidity of the vehicle body front structure 1 can be further increased.

In the embodiment, the rear end portion 37e of the damper attachment section 37 is joined to the upper dash panel 6. Meanwhile, the ridge portion 40, which is extending along at least a portion of the contour of the damper attachment section 37, is formed between the front edge portion 12a of the damper base 12 and the damper attachment section 37.

When the rear end portion 37e of the damper attachment section 37 is joined to the upper dash panel 6, out-of-plane deformation in the region between the rear edge portion 12b of the damper base 12 and the damper attachment section 37 can be suppressed. In addition, when the ridge portion 40 is formed between the front edge portion 12a of the damper base 12 and the damper attachment section 37, out-of-plane deformation in the region between the front edge portion 12a of the damper base 12 and the damper attachment section 37 can be suppressed. Accordingly, the rigidity of the vicinity of the damper attachment section 37 can be increased as a whole.

In the embodiment, the damper housing reinforcement member 21 has the ridge portion 52 which is protruding toward the inner side of the engine compartment 7 and which is extending in the upward/downward direction.

For this reason, the rigidity of the damper input with respect to the load in the upward/downward direction can be increased by the ridge portion 52 of the damper housing reinforcement member 21. Accordingly, a material required for the reinforcement member can be reduced to achieve reduction in weight.

In the embodiment, the second portion 22b and the fourth portion 22d of the corner reinforcement member 22 are formed at substantially same position with each other in the vehicle body forward/rearward direction with respect to the ridge portion 52 of the damper housing reinforcement member 21.

For this reason, the second portion 22b and the fourth portion 22d of the corner reinforcement member 22 and the ridge portion 52 of the damper housing reinforcement member 21 are aligned with each other in the vehicle body width direction, and the rigidity in the vehicle body width direction can be further increased. In addition, according to this configuration, since the rigidity can be increased without increasing a cross sectional area or a plate thickness of the reinforcement member, reduction in weight of the vehicle body front structure 1 can be achieved.

In the embodiment, the step section 22f of the corner reinforcement member 22 covers the corner portion 17a of the closed cross section 17 formed by the upper dash panel reinforcement member 15 and the upper dash panel 6. The step section 22f extends in the vehicle body width direction and is disposed substantially perpendicular to the damper housing 5. For this reason, the rigidity in the vehicle body width direction can be further increased.

In the embodiment, the annular skeleton 61 is formed by the pair of damper housing reinforcement members 21, the pair of corner reinforcement members 22, the upper dash panel reinforcement member 15, and the front sub-frame 62, and the annular skeleton 61 is fixed to at least one of the floor frame 11 and the tunnel frame 66 via the front sub-frame 62.

For this reason, the rigidity of the vicinity of the damper housing 5 is increased by the annular skeleton 61. In addition, as the annular skeleton 61 is fixed to at least one of the floor frame 11 and the tunnel frame 66, the rigidity of the vehicle body front structure 1 can be increased as a whole.

Further, the aspect of the present invention is not limited to the embodiment and various design changes may be made without departing from the scope of the present invention.

REFERENCE SIGNS LIST

1 Vehicle body front structure
3 Front side frame
5 Damper housing
6 Upper dash panel
7 Engine compartment
8 Passenger compartment
11 Floor frame
12 Damper base
13 Wall surface of damper housing
15 Upper dash panel reinforcement member
17a Corner portion of closed cross section
21 Damper housing reinforcement member
22 Corner reinforcement member
22a First portion
22b Second portion
22c Third portion
22d Fourth portion
22f Step section
31 Inner panel
32 Outer panel
34 Extension portion
35 Joint portion
37 Damper attachment section
40 Ridge portion of damper base
52 Ridge portion of damper housing reinforcement member
61 Annular skeleton
62 Front sub-frame
66 Tunnel frame

What is claimed is:
1. A vehicle body front structure comprising:
a front side frame extending in a vehicle body forward/rearward direction;

a damper housing having a wall surface that is disposed above the front side frame and that is directed toward an engine compartment in a vehicle body width direction;

a damper housing reinforcement member that extends along the wall surface of the damper housing in an upward/downward direction and that has a lower end portion which is joined to the front side frame;

an upper dash panel reinforcement member that is installed above the front side frame and that is extending in the vehicle body width direction; and a corner reinforcement member that connects an upper end portion of the damper housing reinforcement member and the upper dash panel reinforcement member, wherein the corner reinforcement member is a member that has a substantially L-shaped step section, and that has (i) a first portion facing the damper housing reinforcement member in the vehicle body width direction and joined to the damper housing reinforcement member, (ii) a second portion extending from a rear end portion of the first portion in the vehicle body forward/rearward direction toward an inner side of a vehicle body in the vehicle body width direction, (iii) a third portion facing the upper dash panel reinforcement member from below and joined to the upper dash panel reinforcement member, and (iv) a fourth portion extending downward from a rear end portion of the third portion in the vehicle body forward/rearward direction, and the first portion and the third portion are formed as a continuous surface, the second portion and the fourth portion are formed as a continuous surface, and a bottom surface of the step section and the first portion are formed as a continuous surface.

2. The vehicle body front structure according to claim 1, wherein the front side frame has an inner panel, and an outer panel which is adjacent to the damper housing and which is joined to the inner panel to form a closed cross section together with the inner panel, the outer panel has an extension portion extending above a joint portion between the outer panel and the inner panel, and a lower end portion of the damper housing reinforcement member is joined to the extension portion of the outer panel together with the damper housing.

3. The vehicle body front structure according to claim 1, wherein the damper housing comprises a damper base having a substantially rectangular shape when seen in a plan view, the damper base has a damper attachment section having a substantially triangular shape when seen in a plan view, a rear end portion of the damper attachment section is joined to an upper dash panel, and the damper base has a ridge portion, which is extending along at least a portion of a contour of the damper attachment section, formed between a front edge portion of the damper base and the damper attachment section.

4. The vehicle body front structure according to claim 1, wherein the damper housing reinforcement member has a ridge portion which is protruding toward an inner side of the engine compartment and which is extending in the upward/downward direction.

5. The vehicle body front structure according to claim 4, wherein the second portion and the fourth portion of the corner reinforcement member are formed at substantially same position with each other in the vehicle body forward/rearward direction with respect to the ridge portion of the damper housing reinforcement member.

6. The vehicle body front structure according to claim 1, wherein the upper dash panel reinforcement member is joined to an upper dash panel and forms a closed cross section together with the upper dash panel, and the step section of the corner reinforcement member covers a corner portion of the closed cross section formed by the upper dash panel reinforcement member and the upper dash panel.

7. The vehicle body front structure according to claim 1, wherein the front side frame, the damper housing reinforcement member, and the corner reinforcement member are formed on left and right sides as pairs, the vehicle body front structure comprises a front sub-frame formed between the pair of front side frames, an annular skeleton is formed by the pair of damper housing reinforcement members, the pair of corner reinforcement members, the upper dash panel reinforcement member, and the front sub-frame, and the annular skeleton is fixed to at least one of a floor frame and a tunnel frame via the front sub-frame.

* * * * *